(12) United States Patent
Huebener et al.

(10) Patent No.: US 6,548,566 B1
(45) Date of Patent: Apr. 15, 2003

(54) LAMINATING ADHESIVES HARDENABLE BY RADIATION

(75) Inventors: Achim Huebener, Seevetal (DE); Guenter Henke, Neuss (DE); Michael Drobnik, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/582,301

(22) PCT Filed: Dec. 14, 1998

(86) PCT No.: PCT/EP98/08193

§ 371 (c)(1),
(2), (4) Date: Aug. 15, 2000

(87) PCT Pub. No.: WO99/33897

PCT Pub. Date: Jul. 8, 1999

(30) Foreign Application Priority Data

Dec. 23, 1997 (DE) .......................... 197 57 622

(51) Int. Cl.⁷ .................. C08G 59/62; C09J 163/00; C08J 5/12; C08J 3/28
(52) U.S. Cl. .................. 522/31; 522/90; 522/129; 522/143; 522/170; 428/414; 156/275.5; 156/275.7; 528/406; 528/418
(58) Field of Search .................. 522/31, 170, 129, 522/143, 90; 156/275.5, 275.7; 428/345, 414; 528/406, 418

(56) References Cited

U.S. PATENT DOCUMENTS

| 4,318,766 A | * | 3/1982 | Smith |
| 4,874,798 A | | 10/1989 | Koleske et al. ............... 522/50 |
| 5,453,450 A | * | 9/1995 | Kinzer et al. |

FOREIGN PATENT DOCUMENTS

| DE | 43 40 949 | 6/1995 |
| EP | 0 620 259 | 10/1994 |
| EP | 0 688 804 | 12/1995 |

* cited by examiner

Primary Examiner—Susan W. Berman
(74) Attorney, Agent, or Firm—Stephen D. Harper

(57) ABSTRACT

A method of forming a film laminate uses an adhesive containing at least three components A, B and C.

The method includes providing a radiation curable adhesive that contains a) a compound bearing at least one epoxy group, b) a compound with at least three OH groups and a molecular weight below 400 and c) a photoinitiator which initiates a polymerization of components a) and b) after exposure to light with a wavelength of 100 to 600 nm.

28 Claims, No Drawings

LAMINATING ADHESIVES HARDENABLE BY RADIATION

This invention relates to an adhesive containing three components A, B and C for the production of film laminates. Component A of the adhesive contains at least one compound containing at least one epoxy group, component B contains at least one compound with at least three OH groups and a molecular weight below 400 and component C contains at least one photoinitiator which initiates a polymerization of components A and B after exposure to light with a wavelength of 100 to 600 nm.

In the field of adhesives, particularly in the lamination of web-form materials, there is an increasing demand for short cure times and a shorter response time of the adhesives used for lamination. Conventional systems widely available on the market are generally based on polyurethane, acrylate or epoxy binders which cure by relatively slow crosslinking through reaction with added hardener or with moisture. The usual cure time for commercially available systems such as these is about 4 to about 21 days. However, a cure time as long as this to achieve maximal strength of the film laminates is generally not desirable.

Film laminates are exposed in their production, processing and use to a number of stresses which, typically, do not occur with other bonded materials or do not occur to the same extent as they do in film laminates. In the production of film laminates, materials partly differing in their flexibility and surface structure are bonded to one another. They are generally web-form materials of, for example, paper, plastics, plastics coated by vapor deposition with metals or metal oxides, more particularly transition metals oxides, or metal foils, more particularly aluminium foils.

During their production, processing and use, the film laminates are exposed to a number of mechanical stresses which impose stringent demands on the mechanical properties of the adhesive establishing the bond between the materials. Since the web-form materials to be bonded are normally materials with high flexibility which are constantly exposed to tensile and flexural stresses during production, processing and use, the adhesive itself has to possess sufficiently high flexibility to be able to withstand the stresses occurring without damage or failure of the adhesive bond.

In addition, however, the adhesive is also expected to show high peel strength to be able to withstand tensile stresses applied perpendicularly to the laminate surface without separation of the film laminate.

In addition, the adhesive is also generally expected to satisfy various criteria in regard to crystallization behavior and discoloration which exceed the performance features of adhesives for conventional applications. For example, in the bonding of transparent plastic films, the film laminate is also expected to remain transparent without clouding through crystallization of the adhesive. In addition, the adhesive must not have any tendency to form colored secondary products, even in the event of prolonged storage of the film laminate, for example under UV light.

In addition, film laminates are expected to show high heat resistance after only a short time. This property is particularly important when film laminates are to be used for packaging products while they are still hot, for example with a view to shortening production and filling cycles. However, the feature of heat resistance is also of importance when, for example, materials already at least partly wrapped in the film laminate are to be subjected to heating.

Problems are generally involved in the bonding of films which do not have the transparency required for initiating the polymerization reaction of the adhesive. If, therefore, the films to be bonded together are non-transparent materials, the adhesive-coated film generally has to be irradiated on the adhesive side before that side is bonded to a second film. This procedure presupposes that bonding to the second film takes place at a time at which polymerization of the adhesive, i.e. curing, is not yet complete. However, the adhesive must be capable of developing sufficient adhesion even at that time to ensure that the second web adheres.

Whereas radical-polymerizing adhesive systems often cure too quickly and show inadequate initial adhesion, cationically polymerizing adhesive systems lend themselves to a laminating process in which the adhesive layer applied to the first film is irradiated and the second film is subsequently applied. This is generally attributable to the fact that cationic systems have a slower cure rate than radical-polymerizing adhesive systems. However, another frequent disadvantage of commercially available systems is that the time which the adhesive bond takes to cure completely is thus too long for economic application of this bonding technique.

A quality criterion increasing in significance for film laminates is the substantial absence of "migrates". Migrates are understood to be low molecular weight constituents of the film laminate which, on the one hand, are not immobile within the laminate, i.e. are capable of migrating within the laminate, and which on the other hand are capable of diffusing from the laminate into the material wrapped in the laminate. Since low molecular weight constituents such as these can affect the physical health of living beings, more particularly human beings, there is a need to provide substantially migrate-free film laminates.

DE-U 94 20 640 relates to radiation-curing compositions containing OH-terminated polyurethanes, an epoxy compound and a photoinitiator. The document in question describes a single-stage, radiation-curing adhesive composition which is characterized both by high initial adhesion and by high ultimate adhesion when it is used as a laminating adhesive.

EP-A 0 688 804 describes multicomponent, cationically curing epoxy compositions and a process for curing these compositions, it describes cationically curing epoxy compositions in various embodiments which generally contain as basic constituents a mixture of compounds that form Lewis acids and/or Brönsted acids under irradiation, cationically polymerizable monomers containing epoxy groups and at least one other constituent selected from the group of flexibilizing agents, retarders, radical-polymerizable monomers, accelerators and modifiers. Alcohols and glycols with a molecular weight of at least 200 to 20,000 g/mole are mentioned as flexibilizing agents.

DE-A 43 40 949 describes cationically curing epoxy compositions and their use. This document mentions a photoinitiated, cationically curing epoxy composition which contains at least one retarder, at least one accelerator, at least one ferrocenium complex salt and at least one cycloaliphatic compound containing epoxy groups together with typical auxiliaries and additives.

The adhesives representing the prior art are generally attended by the disadvantage that they do not satisfy all the requirements which an adhesive used for the production of film laminates is expected to meet. Thus, although quick-curing adhesives can be produced from epoxy compounds and polyurethane polyols, their heat resistance is not as good as it should be, for example, for the preparation of foods or the sterilization of medical instruments.

Accordingly, the problem addressed by the present invention was to provide an adhesive system for the production of film laminates which would withstand the severe stressing involved in the production, processing and use of such laminates and which would have a fast cure time and high shear and peel strengths. Another problem addressed by the invention was to provide an adhesive for the production of film laminates with which it would be possible to obtain film laminates characterized by high heat resistance and a minimal content of migrates (low molecular weight polyols).

The problems stated above have been solved by an adhesive containing at least three components A, B and C which is described in the following.

The present invention relates to the use of an adhesive containing at least three components A, B and C for the production of film laminates,
a) component A containing a compound bearing at least one epoxy group,
b) component B containing a compound with at least three OH groups and a molecular weight below 400 and
c) component C containing a photoinitiator which initiates a polymerization of components A and B after exposure to light with a wavelength of 100 to 600 nm.

In a first embodiment of the present invention, an adhesive containing components A, B and C is used for the production of the film laminates. Component A is at least one compound containing at least one epoxy group or a mixture of two or more such compounds.

An "epoxy group" in the context of the present invention is a functional group which has an oxirane ring. Such epoxy groups can be polymerized in the presence of cationic initiators by methods known to the expert. Component A used in accordance with the present invention may contain a compound containing at least one epoxy group as sole constituent, although a mixture of two or more compounds containing at least one epoxy group may also be used as component A.

It is sufficient for the synthesis of polymers if the compound containing at least one epoxy group present as part of component A contains only one epoxy group. However, it may be desirable—with a view to obtaining a higher degree of crosslinking in the adhesive film—at least partly to use one or more compounds containing more than one epoxy group in the molecule as a constituent of component A. The compounds used as part of component A in accordance with the present invention advantageously contain up to about four epoxy groups per molecule. In one particularly preferred embodiment, the average epoxy group content of component A as a whole is about 1 to about 2.5 and, more particularly, about 1.5 to about 2.0.

Basically, a low molecular weight epoxide may be used as the compound containing at least one epoxy group, although relatively high molecular weight epoxides or mixtures of low molecular weight and relatively high molecular weight epoxides may also be used as component A.

"Low molecular weight compounds" in the context of the present invention are compounds containing at least one epoxy group which have a molecular weight of not more than about 400. Compounds containing at least one epoxy group and having a molecular weight of more than 400 are correspondingly referred to as "relatively high molecular weight compounds" in the present specification.

Relatively high molecular weight compounds containing at least one epoxy group can contain the epoxy group, for example, at the end of a polymer chain, although the epoxy group may also be attached within the polymer backbone or laterally to the polymer backbone. In the case of compounds containing more than one epoxy group, the corresponding relatively high molecular weight compound may also contain epoxy groups in two or more of the described configurations in relation to the main polymer chain. Thus, a compound with more than one epoxy group may contain, for example, one terminal and one lateral epoxy group or one epoxy group within the polymer backbone and one lateral epoxy group.

Compounds containing at least one epoxy group suitable for use as component A in accordance with the present invention include, for example, the cycloaliphatic epoxides. Examples of cycloaliphatic epoxides are bis-(3,4-epoxycyclohexylmethyl)-oxalate, bis-(3,4-epoxycyclohexylmethyl)-adipate, bis-(3,4-epoxy-6-methylcyclohexylmethyl)-adipate and bis-(3,4-epoxycyclohexylmethyl)-pimelate; mixtures of two or more of the compounds mentioned may also be used.

Also suitable are 3,4-epoxycyclohexylmethyl-3,4-epoxycyclohexane carboxylates, for example 3,4-epoxycyclohexylmethyl-3,4-epoxycyclohexane carboxylic acid, 3,4-epoxy-1-methylcyclohexylmethyl-3,4-epoxy-1-methylcyclohexane carboxylic acid, 6-methyl-3,4-epoxycyclohexylmethyl-6-methyl-3,4-epoxycyclohexane carboxylic acid, 3,4-epoxy-2-methylcyclohexylmethyl-3,4-epoxy-2-methylcyclohexane carboxylic acid, 3,4-epoxy-5-methylcyclohexylmethyl-3,4-epoxy-5-methylcyclohexane carboxylic acid or the like or mixtures of two or more thereof.

Other suitable epoxides which may be used in accordance with the present invention include glycidyl ethers obtainable, for example, from polyhydric phenols, for example diglycidyl ethers of 2,2'-bis-(2,3-epoxypropoxyphenol)-propane.

Commercially available compounds containing at least one epoxy group may also be used with advantage. Examples of such compounds are octadecylene oxide, epichlorohydrin, styrene oxide, vinyl cyclohexene oxide, glycidol, glycidyl methacrylate, diglycidyl ethers of bisphenol A (for example EPON 828, EPON 1004 and EPON 1010, products of Shell Chemical Co.; DER-331, DER-332 and DER-334, products of Dow Chemical Co.), vinyl cyclohexene dioxide (for example ERL4206, a product of Union Carbide Corp.), 3,4-epoxycyclohexylmethyl-3,4-epoxycyclohexene carboxylate (for example ERL4221, a product of Union Carbide Corp.), 3,4-epoxy-6-methylcyclohexylmethyl-3,4-epoxy-6-methylcyclohexene carboxylate (for example ERL4201, a product of Union Carbide Corp.), bis-(3,4-epoxy-6-methylcyclohexylmethyl)-adipate (for example ERL-4289, a product of Union Carbide Corp.), bis-(2,3-epoxycyclopentyl)-ether (for example ERL-0400, a product of Union Carbide Corp.), aliphatic propylene-glycol-modified epoxy resin (for example ERL-4050 or ERL-4052, products of Union Carbide Corp.), dipentene dioxide (for example ERL-4269, a product of Union Carbide Corp.), epoxidized polybutadiene (for example OXIRON 2001, a product of FMC Corp.), silicone resin containing epoxy functionality, flame-retardant epoxy resins (for example DER-580, a product of Dow Chemical Co.), butane-1,4-diol diglycidyl ethers of phenol-formaldehyde novolak (for example DEN-431 or DEN-438, products of Dow Chemical Co.) and resorcinol diglycidyl ether (for example KOPOXITE, a product of Koppers Co., Inc.).

Other suitable compounds containing at least one epoxy group are polymers containing epoxy groups obtainable, for example, by the polymerization of ethylenically unsaturated epoxy compounds bearing epoxy groups. Examples of such epoxyfunctional ethylenically unsaturated compounds are the acrylates of glycidol, for example glycidyl acrylate or glycidyl methacrylate. These compounds are advantageously copolymerized with at least one other ethylenically unsaturated compound that does not bear any epoxy groups. Polyurethanes containing epoxy groups, for example, are also suitable. Such polyurethanes are obtainable, for example, by reacting OH-functional polyesters or polyethers with poly-functional isocyanates, the stoichiometric ratio of isocyanate groups to OH groups being selected so that the corresponding polyurethane has at least one free isocyanate group which is subsequently reacted, for example, with 1-hydroxy-2,3-epoxypropane or another suitable epoxide.

Component A generally contains up to about 30% by weight and preferably up to about 10% by weight of a compound containing only one epoxy group. The percentage content of compounds containing two or more epoxy groups is up to about 50% by weight and preferably about 10 to about 40% by weight, the percentage content of epoxides with a functionality of three or more in component A being up to about 10% by weight.

Based on the adhesive as a whole, the percentage content of component A is from 1 to 98% by weight, preferably from about 5 to about 60% by weight and merit preferably from about 10 to about 40% by weight.

Component B present in the adhesives used in accordance with the invention contains a compound with at least three OH groups and a molecular weight below 400.

The percentage content of trifunctional compound, i.e. a compound containing three OH groups, is about 1 to about 10% by weight, based on the adhesive as a whole.

Suitable OH-containing compounds are, for example, higher alcohols, such as glycerol, trimethylol propane, pentaerythritol and sugar alcohols, and oligomeric ethers of the individual compounds mentioned or oligomeric ethers of a mixture of two or more of the compounds mentioned with one another.

In addition, the reaction products of low molecular weight polyhydric alcohols with alkylene oxides containing up to 4 carbon atoms may be used as the polyol component for producing the polyesters. Suitable reaction products are, for example, reaction products of polyhydric alcohols, such as glycerol, trimethylol ethane and/or trimethylol propane, pentaerythritol or sugar alcohols with the alkylene oxides mentioned to form oligoether polyols with a molecular weight of not more than about 400.

The adhesive to be used in accordance with the invention contains a photoinitiator or a mixture of two or more photoinitiators as component C. The photoinitiator is capable of initiating the polymerization of the epoxy groups by exposure to radiation. Photoinitiators which produce Lewis or Brönsted acids under the effect of electromagnetic radiation, more particularly under the effect of light, are particularly suitable for this purpose.

According to the invention, complex onium compounds are preferably used as the photoinitiators which produce Lewis acids and/or Brönsted acids under the effect of light. Basically, any photosensitive aromatic sulfonium or iodonium salts are suitable for the light-induced initiation of the polymerization reaction. The trisaryl sulfonium hexafluoroantimonates, the trisaryl sulfonium hexafluorophosphates present, for example, in the commercial products Cyracure® UVI-6974 and UVI-6990 (products of UCC, Danbury, UK) and bis-(4,4'-dimethylbenzyl)-iodonium tetra-(pentafluorophenyl)-borate (UV CATA 200, a product of Rhone-Poulenc, Saint-Fons, France) are particularly suitable.

The photoinitiator used in accordance with the present invention is capable of initiating a polymerization of component A after exposure to light with a wavelength of about 100 to about 600 nm. In one preferred embodiment of the invention, the polymerization is initiated by exposure to light with a wavelength of about 150 to about 500 nm, for example in the range from about 200 to about 480 nm.

The adhesive to be used in accordance with the invention may contain a compound with a least two OH groups and a molecular weight of at least 400 or a mixture of two or more such compounds as component D.

Compounds suitable for use as component D are, for example, polyester polyols, polyether polyols, polyurethane polyols, polycarbonate polyols, polyvinyl acetyl polyols, polyacrylate polyols, polymethacrylate polyols or copolymers of suitable acrylate salts and methacrylates or mixtures of two or more of the polyols mentioned.

The compounds used as component D have a molecular weight of preferably more than about 400 to about 10,000 and, more preferably, more than about 400 to about 2000.

According to the invention, polyester polyols, polyether polyols and polyurethane polyols are particularly preferred as component D.

The polyester polyols suitable as component D are preferably polyesters with a molecular weight ($M_n$) of more than about 400 to about 10,000. Preferred polyester polyols are prepared, for example, by reaction of low molecular weight alcohols, more particularly ethylene glycol, diethylene glycol, neopentyl glycol, hexanediol, butanediol, propylene glycol, glycerol or trimethylol propane, by polycondensation with a polycarboxylic acid or a mixture of two or more such acids. For example, dihydric and/or trihydric alcohols may be condensed with dicarboxylic acids and/or tricarboxylic acids or reactive derivatives thereof to form polyesters. Suitable dicarboxylic acids are, for example, succinic acid and higher homologs thereof containing up to 16 carbon atoms, unsaturated dicarboxylic acids, such as maleic acid or fumaric acid, an aromatic dicarboxylic acids, more particularly the isomeric phthalic acids, such as phthalic acid, isophthalic acid or terephthalic acid. Suitable tricarboxylic acids are, for example, citric acid and trimellitic acid. Also suitable are aliphatic polycarboxylic acids, such as adipic acid, glutamic acid, pimelic acid, aromatic acids, such as naphthalene dicarboxylic acid, cycloalkyl acids, such as cyclohexane dicarboxylic acid, or acids containing hetero atoms, such as S or N, for example diglycolic acid, ethylether-2,2-dicarboxylic acid or thiodiglycolic acid.

Other polyols suitable for the production of the polyesters are aliphatic alcohols containing two to four OH groups per molecule. The OH groups are preferably primary, but may also be secondary. Suitable aliphatic alcohols include, for example, ethylene glycol, propylene glycol, butane-1,4-diol, pentane-1,5-diol, hexane-1,6-diol, heptane-1,7-diol, octane-1,8-diol and higher homologs and isomers thereof which can be obtained by the expert by extension of the hydrocarbon chain by one $CH_2$ group at a time or by introduction of branches into the carbon chain. Also suitable are higher alcohols, for example glycerol, trimethylol propane, pentaerythritol and oligomeric ethers of the substances mentioned either as such or in the form of mixtures of two or more of the ethers mentioned with one another.

In addition, the reaction products of low molecular weight polyhydric alcohols with alkylene oxides containing up to 4 carbon atoms may also be used as the polyol component for producing the polyesters. Suitable reaction products are, for example, reaction products of ethylene glycol, propylene glycol, the isomeric butane diols or hexane diols with ethylene oxide, propylene oxide and/or butylene oxide. The reaction products of polyhydric alcohols, such as glycerol, trimethylol ethane and/or trimethylol propane, pentaerythritol, or sugar alcohols with the alkylene oxides mentioned to form polyether polyols are also suitable. In addition, the reaction products of low molecular weight polyhydric alcohols with alkylene oxides containing up to 4 carbon atoms may also be used as the polyol component for producing the polyesters. Suitable reaction products are, for example, reaction products of ethylene glycol, propylene glycol, the isomeric butane diols or hexane diols, with ethylene oxide, propylene oxide and/or butylene oxide. The reaction products of polyhydric alcohols, such as glycerol, trimethylol ethane and/or trimethylol propane, pentaerythritol or sugar alcohols, with the alkylene oxides mentioned to form polyether polyols are also suitable. Particularly suitable polyols for producing the polyesters are polyether polyols with a molecular weight of about 100 to 5000 and preferably in the range from about 200 to about 3000. Propylene glycol with a molecular weight of about 300 to about 2500 is most particularly preferred for the purposes of the present invention. Polyether polyols obtained, for example, by the polymerization of tetrahydrofuran are also suitable.

A group of polymers preferably used as component D in accordance with the present invention are the polyurethane polyols. In the context of the present invention, polyurethane polyols are understood to be compounds obtainable by polyaddition of dihydric and/or higher alcohols and polyisocyanates. Polyesters and/or polyethers with a molecular weight of about 300 to 10,000 and preferably in the range from about 800 to about 5000 containing at least two hydroxy groups are typically selected as polyols for the production of the polyurethanes. Polyesters suitable for the production of the polyurethanes usable in accordance with the present invention are any OH-terminated polyesters which can be chain-extended by reaction with an at least difunctional isocyanate. These include, for example, the polyesters mentioned above.

Other dihydroxy compounds which may be used for the preparation of the polyesters suitable for use as polyol component for producing the polyurethanes are, for example, butane-1,3-diol, butane-1,4-diol, butane-2,3-diol, 2,2-diethylpropane-1,3-diol, 2-methyl-2-propylpropane-1,3-diol, isomeric octane diols, ethylenically unsaturated difunctional compounds, such as heptene diol, octene diol, and difunctional compounds containing N or S hetero atoms, for example diethylene glycol, triethylene glycol, thioethylene glycol, diethanolamine or N-methyl diethanolamine or mixtures of two or more thereof.

To produce the polyurethanes, the diols are generally reacted with corresponding, at least difunctional isocyanates. The isocyanates used in accordance with the present invention may be aliphatic or aromatic and may contain about 4 to about 40 carbon atoms. Examples of suitable isocyanates are hexamethylene diisocyanate (HDI), 1,8-octane diisocyanate, 1,10-decane diisocyanate, diisocyanates obtainable, for example, from the dimerization of fatty acids and corresponding subsequent functionalization, 1,4-phenylene diisocyanate, tetramethyl xylylene diisocyanate (TMXDI), 2,4- and 2,6-toluene diisocyanate and mixtures thereof, 1,5-naphthylene diisocyanate, 2,4'- or 4,4'-diphenyl methane diisocyanate (MDI) and mixtures thereof, isophorone diisocyanate (IPDI), cyclobutane-1,3-diisocyanate, cyclohexane-1,3- and -1,4-diisocyanate, 2,4- and 2,6-hexahydrotoluene diisocyanate, hexahydro-1,3- or -1,4-phenylene diisocyanate, 2,2'-diphenyl methane diisocyanate or 4,4'-diphenyl methane diisocyanate or mixtures of two or more of the diisocyanates mentioned. Other suitable isocyanates for producing the polyurethane present in component A are trifunctional or higher polyisocyanates obtainable, for example, by oligomerization of diisocyanates. Examples of such trifunctional and higher polyisocyanates are the triisocyanurates of HDI or IPDI or mixed triisocyanurates thereof.

In general, the average molecular weight of the polymers used as component D should not be any lower than 400. Since polymers generally have a statistical molecular weight distribution depending on the particular method selected for their synthesis, the expression "average molecular weight" relates to the number average ($M_n$) of the molecular weight of the polymers present in component A. This allows for the fact that individual polymeric molecules of which the molecular weight is below the value of 400 mentioned may also be present.

In addition to components A, B and C and optionally D, the adhesive to be used in accordance with the invention may also contain another component E. Component E contains at least one compound or a mixture of two or more compounds containing a cationically polymerizable functional group which is not an epoxy group. Examples of such compounds are olefins, vinyl ethers, vinyl arenes, more particularly styrene, and heterocyclic compounds, such as ethers, thioethers, esters or acetals. Vinyl ethers formally obtainable, for example, from the etherification of alcohols, preferably polyols, and vinyl ethers (in fact acetylene is generally used as starting material in the industrial production of the vinyl ethers) and vinyl styrene are preferred for the purposes of the present invention.

The compounds containing at least one cationically polymerizable functional group which is not an epoxy group suitable for use as component E in accordance with the present invention may contain one or preferably several cationically polymerizable groups. The compound to be used as component E may be a low molecular weight compound, i.e. a compound with a molecular weight of up to about 400, although a relatively high molecular weight compound with a molecular weight of about 400 to about 10,000 or even higher may equally well be used. Component E used in the adhesive to be used in accordance with the invention may contain only a single compound, although a mixture of two or more compounds containing cationically polymerizable groups that are not epoxy groups may equally well be used.

According to the invention, vinyl ethers are particularly preferred as component E. Suitable low molecular weight vinyl ethers are, for example, monofunctional and difunctional vinyl ethers. Examples include hydroxybutyl vinyl ether, triethylene glycol divinyl ether, cyclohexane dimethanol divinyl ether, propylene carbonate propenyl ether, dodecyl vinyl ether, cyclohexane dimethanol monovinyl ether, cyclohexyl vinyl ether, diethylene glycol divinyl ether, 2-ethylhexyl vinyl ether, dipropylene glycol divinyl ether, tripropylene glycol divinyl ether, hexane diol divinyl ether, octadecyl vinyl ether or butane diol divinyl ether. Divinyl ethers of higher alcohols may also be used as component E. Examples include glycerol monovinyl ether, glycerol divinyl ether, glycerol trivinyl ether, trimethylol propane mono-, di- or trivinyl ether, pentaerythritol mono-, di-, tri- or tetravinyl ether or vinyl ethers of alcohols containing more than four OH groups, for example vinyl ethers of sugar alcohols. The compounds mentioned may be used individually as component E, although component E may equally well be a mixture of two or more of the vinyl ethers mentioned.

According to the invention, butane diol divinyl ether is preferably used as component E.

Where a relatively high molecular weight compound is used as component E, the compound in question is preferably a polymer containing a cationically polymerizable group that is not an epoxy group as terminal groups or optionally as lateral groups to the main polymer chain. Compounds such as these, which may preferably be used individually or in the form of a mixture of two or more thereof as component E of the adhesive to be used in accordance with the invention, may be obtained, for example, from the relatively high molecular weight polyol components described as component D in the present specification. For example, a vinyl styrene-terminated polymer may be prepared by reacting an OH-terminated polymer with 4-styrene isocyanate. A polyester polyol or polyether polyol or a polyurethane is preferably used as the OH-terminated polymer.

A broad range of polymers containing vinyl ether groups may also be prepared. To this end, an OH-containing polymer, for example, is reacted with an at least two-fold excess of diisocyanates (based on OH groups). The polymer thus prepared containing free NCO groups is then reacted with hydroxyvinyl ethers. Polymers containing vinyl ethers may also be prepared by initially reacting an OH-containing vinyl ether with an equimolar quantity of a diisocyanate and subsequently reacting the reaction product with an OH-terminated polymer. According to the invention, preferred OH-containing vinyl ethers are hydroxybutyl vinyl ether, hydroxyhexyl vinyl ether and cyclohexane dimethanol monovinyl ether.

The adhesive to be used in accordance with the invention preferably contains component E in a quantity of up to 20% by weight. In one preferred embodiment, the adhesive to be used in accordance with the invention contains component E in a quantity of, for example, 0.1% by weight to about 10% by weight, for example in a quantity of about 1 to about 8% by weight, based on the adhesive as a whole.

The adhesives to be used in accordance with the invention may additionally contain additives including, for example, accelerators, dyes, pigments, fillers, reinforcing agents, thixotropicizing agents, initiators, stabilizers, inhibitors or coupling agents. Accelerators are generally used to accelerate the polymerization reaction. This may be done either by accelerating the initiation reaction taking place under the effect of radiation or by supporting the polymerization itself, i.e. the addition of the individual monomers onto one another.

The additives may be present in the adhesive according to the invention in a total quantity of up to about 20% by weight and preferably in a total quantity of up to about 10% by weight, for example in a quantity of about 1% by weight to about 8% by weight or about 3% by weight to about 5% by weight, based on the adhesive as a whole.

The adhesive compositions according to the invention are normally prepared by mixing the components mentioned. The resulting mixtures may be applied to the films to be bonded by machines normally used for such purposes, for example by conventional laminating machines. Application of the adhesives in liquid form to a film to be bonded to form a laminate is particularly suitable.

If at least one of the films to be bonded to the surface of the film laminate is a transparent film, the adhesive-coated film may immediately be laminated with the second film. The film laminate is then transferred to an irradiation zone where the polymerization reaction, i.e. the crosslinking of the individual adhesive components, is initiated by exposure of the transparent film side to ultraviolet radiation.

If the films to be bonded together are materials which are not transparent to polymerization-initiating radiation, the adhesive-coated film generally has to be irradiated on the adhesive side before that side is bonded to a second film. This procedure presupposes that the adhesive-coated film is applied to the second film at a time when the polymerization of the adhesive, i.e. the curing process, is still not complete. The adhesive must be capable of developing sufficient adhesion at that time for the second web to adhere.

The described bonding and laminating process may be repeated several times so that laminates consisting of more than two bonded layers can be produced.

The bondable materials include, for example, paper, cellulose hydrate, plastics, such as polyethylene, polypropylene, polyethylene terephthalate, polyvinyl chloride, copolymers of vinyl chloride and vinylidene chloride, copolymers of vinyl acetate olefins, polyamides, or metal foils, for example of aluminium, lead or copper.

The following Examples are intended to illustrate the invention without limiting it in any way.

EXAMPLES

Abbreviations used:

| PPG: | polypropylene glycol |
| Poly-THF: | polytetrahydrofuran |
| CAPA: | polycaprolactone |
| MDI: | 4,4'-diphehyl methane diisocyanate |
| HBVE: | hydroxybutyl vinyl ether |

Formulation Example

| Basis cycloaliphat. epoxide OH-termin. Use of low molecular weight CAPA and vinyl ether | PPG | 7.1% |
| --- | --- | --- |
| | Aromatic polyester | 39.8% |
| | MDI | 8.7% |
| | Cycloaliphatic epoxide | 28.9% |
| | CAPA | 2.9% |
| | Divinyl ether | 9.1% |
| | Initiator | 3.5% |
| | | 100.0% |

What is claimed is:

1. A method of forming a film laminate comprising:
   i) providing an adhesive composition between a first film and a second film, the adhesive composition comprising components A, B, C, and E;
      a) component A comprising a compound bearing at least one epoxy group,
      b) component B comprising at least one compound with at least three OH groups and a molecular weight below about 400, the compound selected from the group consisting of glycerol, trimethylol ethane, trimethylol propane, pentaerythritol, sugar alcohols, polycaprolactone, oligomeric ethers of glycerol, trimethylol ethane, trimethylol propane, pentaerythritol and sugar alcohols, and reaction products of polyhydric alcohols and alkylene oxides,
      c) component C comprising a photoinitiator which initiates a polymerization of components A and B after exposure to light with a wavelength of 100 to 600 nm; and,
      e) component E being a compound or a mixture of two or more compounds containing a cationically polymerizable functional group that is not an epoxy group and,
   ii) exposing the adhesive composition to light.

2. The method of claim 1 wherein the adhesive composition further comprises a component D,
   d) component D comprising a compound with at least two OH groups and a molecular weight of at least 400.

3. The method of claim 2 wherein component D comprises a compound selected from the group consisting of polyester polyols, polyether polyols, polycarbonate polyols, polyacetal polyols and polyurethane polyols.

4. The method of claim 1 wherein component A has a molecular weight of less than 400.

5. The method of claim 1 wherein component A has a molecular weight of more than 400.

6. The method of claim 1 wherein Component B comprises an alcohol containing 3 to 6 OH groups.

7. The method of claim 1 wherein the photoinitiator of component C is selected from the group consisting of triaryl sulfonium salts and diaryl iodonium salts.

8. The method of claim 1 wherein component E of the adhesive composition is a compound having a molecular weight up to about 400.

9. The method of claim 1 wherein component E of the adhesive composition is a compound having a molecular weight from about 400 to about 10,000.

10. The method of claim 1 wherein component E of the adhesive composition is selected from the group consisting of olefins, vinyl ethers, vinyl arenes, heterocyclic compounds and mixtures thereof.

11. The method of claim 10 wherein the vinyl ethers are selected from the group consisting of hydroxybutyl vinyl ether, triethylene glycol divinyl ether, cyclohexane dimethanol divinyl ether, propylene carbonate propenyl ether, dodecyl vinyl ether, cyclohexane dimethanol monovinyl ether, cyclohexyl vinyl ether, diethylene glycol divinyl ether, 2-ethylhexyl vinyl ether, dipropylene glycol divinyl ether, triipropylene glycol divinyl ether, hexane diol divinyl ether, octadecyl vinyl ether, butane diol divinyl ether, glycerol monovinyl ether, glycerol divinyl ether, glycerol trivinyl ether, trimethylol propane monoether, trimethylol propane diether, trimethylol propane triether, vinyl ethers of alcohols containing greater than four OH groups and mixtures thereof.

12. The method of claim 10 wherein the heterocyclic compounds are selected from the group consisting of ethers, thioethers, esters, acetals and mixtures thereof.

13. The method of claim 10 wherein the vinyl arene is styrene.

14. The method of claim 1 wherein the adhesive comprises;
   1% to 98% by weight component A;
   1% to 10% by weight of component B;
   1% to 10% by weight of component C; and
   0.1 to 10% by weight of component E.

15. An adhesive composition comprising components A, B, C and E:
   a) component A comprising a compound bearing at least one epoxy group;
   b) component B comprising at least one compound with at least three OH groups and a molecular weight below about 400, the compound selected from the group consisting of glycerol, trimethylol ethane, trimethylol propane, pentaerythritol, sugar alcohols, polycaprolactone, oligomeric ethers of glycerol, trimethylol ethane, trimethylol propane, pentaerythritol and sugar alcohols, and reaction products of polyhydric alcohols and alkylene oxides; and
   c) component C comprising a photoinitiator which initiates a polymerization of components A and B after exposure to light with a wavelength of 100 to 600 nm; and
   e) component E being a compound or a mixture of two or more compounds containing a cationically polymerizable functional group that is not an epoxy group.

16. The adhesive composition of claim 15 wherein the adhesive comprises:
   1% to 98% by weight of component A;
   1% to 10% by weight of component B;
   1% to 10% by weight of component C; and
   0.1% to 10% by weight of component E.

17. The adhesive composition of claim 15 wherein the adhesive composition further comprises a component D,
   d) component D being a compound with at least two OH groups and a molecular weight of at least 400.

18. The adhesive composition of claim 17 wherein component D comprises a compound selected from the group consisting of polyester polyols, polyether polyols, polycarbonate polyols, polyacetal polyols and polyurethane polyols.

19. The adhesive composition of claim 15 wherein the photoinitiator of component C is selected from the group consisting of triaryl sulfonium salts and diaryl iodonium salts.

20. The adhesive composition of claim 15 wherein component A has a molecular weight of less than 400.

21. The adhesive composition of claim 15 wherein component A has a molecular weight of more than 400.

22. The adhesive composition of claim 15 wherein component E of the adhesive composition is a compound having a molecular weight up to about 400.

23. The adhesive composition of claim 15 wherein component E of the adhesive composition is a compound having a molecular weight from about 400 to about 10,000.

24. The adhesive composition of claim 15 wherein component E of the adhesive composition is selected from the group consisting of olefins, vinyl ethers, vinyl arenes, heterocyclic compounds and mixtures thereof.

25. The adhesive composition of claim 24 wherein the vinyl ethers are selected from the group consisting of hydroxybutyl vinyl ether, triethylene glycol divinyl ethers, cyclohexane dimethanol divinyl ether, propylene carbonate propenyl ether, dodecyl vinyl ether, cyclohexane dimethanol monovinyl ether, cyclohexyl vinyl ether, diethylene glycol divinyl ether, 2-ethylhexyl vinyl ether, dipropylene glycol divinyl ether, triipropylene glycol divinyl ether, hexane diol divinyl ether, octadecyl vinyl ether, butane diol divinyl ether, glycerol monovinyl ether, glycerol divinyl ether, glycerol trivinyl ether, trimethylol propane monoether, trimethylol propane diether, trimethylol propane triether, vinyl ethers of alcohols containing greater than four OH groups and mixtures thereof.

26. The adhesive composition of claim 24 wherein the heterocyclic compounds are selected from the group consisting of ethers, thioethers, esters, acetals and mixtures thereof.

27. The adhesive composition of claim 24 wherein the vinyl arene is styrene.

28. An adhesive composition comprising components A, B, C and E, component A comprising about 5% to about 40% by weight of the adhesive as a whole a compound containing at least one epoxy group, component B comprising about 1% to about 10% by weight of the adhesive as a whole at least one compound with at least three OH groups and a molecular weight below about 400, the compound selected from the group consisting of glycerol, trimethylol ethane, trimethylol propane, pentaerythritol, sugar alcohols, polycaprolactone, oligomeric ethers of glycerol, trimethylol ethane, trimethylol propane, pentaerythritol and sugar alcohols, and reaction products of polyhydric alcohols and alkylene oxides, component C comprising at least one photoinitiator capable of initiating the polymerization of the epoxy groups by exposure to light and component E comprising about 0.1% to about 10% by weight of the adhesive as a whole a compound or a mixture of two or more compounds containing a cationically polymerizable functional group that is not an epoxy group.

* * * * *